(12) United States Patent
Kasahara et al.

(10) Patent No.: US 12,192,700 B2
(45) Date of Patent: Jan. 7, 2025

(54) AUDIO SPOT SYSTEM AND AUDIO SPOT FORMING METHOD (71) Applicant: NIPPON TELEGRAPH AND TELEPHONE CORPORATION, Tokyo (JP)

(72) Inventors: Hisatoshi Kasahara, Tokyo (JP); Yuta Ikeguchi, Tokyo (JP); Yusuke Yoshimura, Tokyo (JP); Atsushi Aratake, Tokyo (JP); Shuichi Yanagi, Tokyo (JP); Suguru Oguchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 163 days.

(21) Appl. No.: 17/915,438

(22) PCT Filed: Mar. 30, 2020

(86) PCT No.: PCT/JP2020/014589
§ 371 (c)(1),
(2) Date: Sep. 28, 2022

(87) PCT Pub. No.: WO2021/199166
PCT Pub. Date: Oct. 7, 2021

(65) Prior Publication Data
US 2023/0146117 A1 May 11, 2023

(51) Int. Cl.
*H04R 1/40* (2006.01)
*B60W 50/14* (2020.01)
(Continued)

(52) U.S. Cl.
CPC ............. *H04R 1/403* (2013.01); *B60W 50/14* (2013.01); *G10K 11/34* (2013.01); *H04R 3/12* (2013.01); *B60W 2050/143* (2013.01)

(58) Field of Classification Search
CPC ......... H04R 1/403; H04R 3/12; B60W 50/14; B60W 2050/143; G10K 11/34
(Continued)

(56) References Cited

U.S. PATENT DOCUMENTS 9,219,974 B2 * 12/2015 Ko ........................... H04S 1/002
2005/0195985 A1 * 9/2005 Croft, III ................ H04R 17/00
367/137

(Continued)

FOREIGN PATENT DOCUMENTS

JP 2016192145 A 11/2016

OTHER PUBLICATIONS

Hanai Co., Ltd. "Tomaru-kun (compulsory stop device for approaching vehicles)" literature [online] Accessed on Feb. 6, 2020, website: http://www.eight-guard.com/products/tomarukun/.
West Nippon Expressway Sogo Service Okinawa Company Limited "USIMPACT [Ultrasonic Impact]" West Nippon Expressway Company Limited, NEXCO West Japan Group technical products [online] Accessed on Feb. 6, 2020, website: https://corp.w-nexco.co.jp/techno/product/mat05.html.
(Continued)

*Primary Examiner* — Sean H Nguyen (57) ABSTRACT

An audio spot forming system (S) is an audio spot forming system which transmits an alert sound to a vehicle traveling on a road, the audio spot forming system including a first parametric speaker (1) configured to emit a sideband wave, and a second parametric speaker (2) configured to emit a carrier wave, in which the sideband wave and the carrier wave are caused to intersect with each other on the road to form an audio spot.

18 Claims, 12 Drawing Sheets

(51) Int. Cl.
  *G10K 11/34* (2006.01)
  *H04R 3/12* (2006.01)
(58) Field of Classification Search
  USPC .......................................................... 381/182
  See application file for complete search history.

(56) References Cited

U.S. PATENT DOCUMENTS

| | | | |
|---|---|---|---|
| 2006/0280315 A1* | 12/2006 | Norris | H04R 1/403 |
| | | | 381/77 |
| 2015/0110333 A1* | 4/2015 | Norris | H04R 19/02 |
| | | | 381/394 |
| 2015/0256909 A1* | 9/2015 | Kappus | H03F 3/19 |
| | | | 381/120 |

OTHER PUBLICATIONS

Yushi Otsuki (2019) "Amazing new products that make highway construction safe!" [Highway Techno Fair 2019] JAF Mediaworks Co., Ltd., Kurukura, Oct. 18, 2019 [online] website: https://kurukura.jp/safety/191017-20.html.

Nishiura et al. "Practical use of space sharing technology" Bright Future for All Ages with Health Innovation by Daily Exercise [online] Accessed on May 18, 2020, website: http://www.activeforall.jp/project/project02/.

Nippon Telegraph and Telephone Corporation (2019) "Preventing traffic accidents by micro-area audio spot technology" Tsukuba Forum, Oct. 31, 2019.

* cited by examiner

AUDIO SPOT SYSTEM AND AUDIO SPOT FORMING METHOD

CROSS-REFERENCE TO RELATED APPLICATIONS

This application is a U.S. National Stage Application filed under 35 U.S.C. § 371 claiming priority to International Patent Application No. PCT/JP2020/014589, filed on 30 Mar. 2020, the disclosure of which is hereby incorporated herein by reference in its entirety.

TECHNICAL FIELD

The present disclosure relates to an audio spot forming system and a method for forming an audio spot.

BACKGROUND ART

In paving a road or in inspecting or repairing infrastructure embedded under a road, for example, it is necessary to perform work in a state where a construction work zone is set up on the road. When such work is performed, to allow vehicles to suitably pass through, it is necessary to arrange traffic guards, signs and the like in the vicinity of the construction work zone so as to control traffic. Regardless of such a countermeasure, however, there is a continuing problem of entry accidents where a vehicle erroneously collides with a construction work zone, thus causing accidents resulting in injury.

Conventionally, there are known techniques to prevent human injury caused by such accidents. In the first technique, a vehicle speed is detected with a doppler radar, and a warning is given to construction workers when there is a possibility of collision (see Patent Literature 1, for example). However, this technique has a disadvantage that this technique cannot give a warning to the driver. Therefore, such a technique leads to a reduction of injuries, but does not lead to a reduction of accidents.

In the second technique, a device which physically stops a vehicle is installed in front of a construction work zone (see Non-Patent Literature 1, for example). However, this technique has disadvantages of the possibility of injury to the driver and the possibility of leading to secondary accidents due to the sudden stopping of the vehicle.

To eliminate collision accidents by solving the disadvantages of the above-mentioned two techniques, it is effective to directly alert the driver. A collision accident is mostly caused due to careless or drowsy driving of the driver and hence, it is desirable to aurally alert the driver. As a technique for this purpose, for example, there is a known technique to directly alert the driver by using parametric speakers (see Non-Patent Literature 2, for example).

CITATION LIST

Patent Literature

Patent Literature 1: Japanese Patent Laid-Open No. 2016-192145

Non-Patent Literature

Non-Patent Literature 1: "TOMARUKUN (equipment to forcibly stop vehicles from entering)", [online], HANAI CO., LTD., [searched on Mar. 18, 2020], Internet, <URL: http://www.eight-guard.com/products/tomarukun/>

Non-Patent Literature 2: "USIMPACT [ultrasonic impact]", [online], West Nippon Expressway Company Limited, [searched on Mar. 18, 2020], Internet, <URL: https://corp.w-nexco.co.jp/techno/product/mat05.html>

SUMMARY OF THE INVENTION

Technical Problem

However, when a sound is emitted by using a technique proposed in the above-mentioned Non-Patent Literature 2, all regions on a straight line of an emitted ultrasound form audible regions. Therefore, in an urban area or a residential area, ultrasound reflects and hence, a voice is heard at many places. Such a situation may cause complaints and hence, there is a limitation on a place where such a technique can be used.

The present invention has been made in view of the above, and it is an object of the present invention to provide an audio spot forming system and a method for forming an audio spot that can reduce entry accidents by making an alert by a sound only in a specific region.

Means for Solving the Problem

To solve the above-mentioned problem, the present disclosure is directed to an audio spot forming system which transmits an alert sound to a vehicle traveling on a road, the audio spot forming system including a first parametric speaker configured to emit a sideband wave, and a second parametric speaker configured to emit a carrier wave, in which the sideband wave and the carrier wave are caused to intersect with each other on the road to form an audio spot.

To solve the above-mentioned problem, the present disclosure is directed to a method for forming an audio spot where an alert sound is transmitted to a vehicle traveling on a road, the method including the steps of emitting a sideband wave by a first parametric speaker, emitting a carrier wave by a second parametric speaker, and forming the audio spot by causing the sideband wave and the carrier wave to intersect with each other on the road.

Effects of the Invention

With the audio spot forming system and the method for forming an audio spot according to the present invention, it is possible to reduce entry accidents by making an alert by a sound only in a specific region.

DESCRIPTION OF EMBODIMENTS

This embodiment discloses a technique to reduce entry accidents by forming an audio spot in a specific region by using parametric speakers. A related technique is disclosed in the following Non-Patent Literature 3.

[Non-Patent Literature 3] Yui Matsui, three others, "Formation of audio spot by separate emission of carrier wave and sideband wave", Journal of the Institute of Electronics, Information and Communication Engineers, Japan, 2014, April, A Vol. J97-A, No. 4, pp. 304 to 312

In the above-mentioned related technique, a carrier wave and a sideband wave are separately emitted by using a plurality of parametric speakers to form an audible audio spot only in a specific region. With such a related technique, it is possible to reduce unintended noise damage to a third party caused by a reflected wave.

An audio spot forming system of this embodiment forms an audio spot in a specific region by making use of parametric speakers like the parametric speakers described in the above-mentioned Non-Patent Literature 3, for example.

A method for arranging a plurality of parametric speakers and a method for determining the length of the audio spot in the audio spot forming system of this embodiment will be disclosed below.

[Method for Arranging Parametric Speakers]

Figure 1:
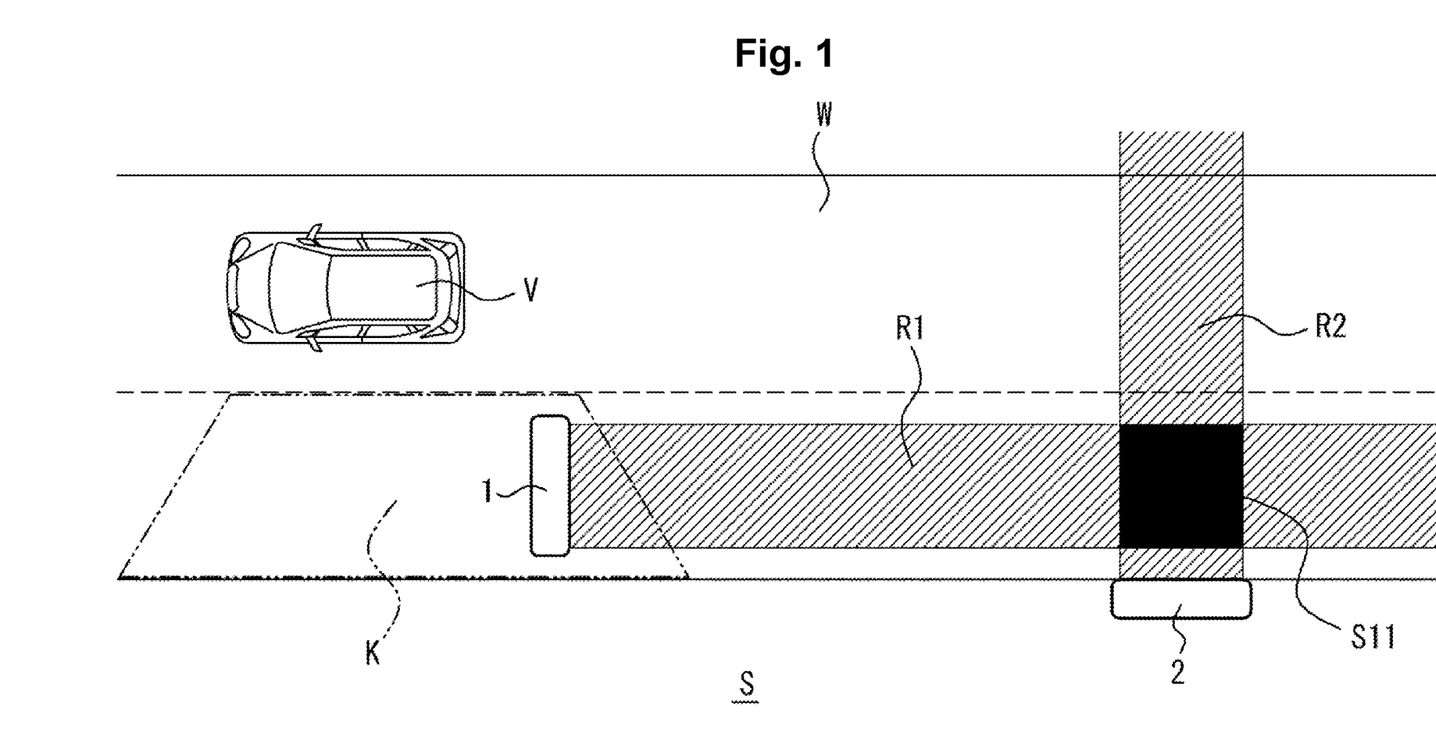
FIG. 1 is an arrangement diagram of an audio spot forming system of this embodiment.

FIG. 1 shows an audio spot forming system S of this embodiment. The audio spot forming system S includes a first parametric speaker 1 (hereinafter also referred to as "first speaker 1") and a second parametric speaker 2 (hereinafter also referred to as "second speaker 2"). A vehicle V travels on a road W. The vehicle V may be any one of a four-wheel automobile, a motorcycle, a bicycle, a bicycle with a prime mover, or a construction vehicle. For example, the road W includes two traffic lanes, and a construction work zone K is provided to one of the two traffic lanes. The first speaker 1 is arranged in the construction work zone K. The second speaker 2 is arranged in a roadside belt provided on the side of the road W. The arrangement of the first speaker 1 and the second speaker 2 is not limited to the above. Alternatively, the arrangement of the first speaker 1 and the second speaker 2 may be determined depending on the width or shape of a road, geographic constraint, a sound pressure or sound quality which is desired to be achieved at an audio spot and the like. The first speaker 1 and the second speaker 2 may also be arranged at arbitrary positions where the first speaker 1 and the second speaker 2 inhibit neither vehicle traffic nor work performed in the construction work zone K.

Each of the first speaker 1 and the second speaker 2 may include a processor and a memory. The processor includes, for example, one or more general purpose processors each including a CPU (Central Processing Unit) or an MPU (Micro Processing Unit). The processor may include one or more dedicated processors specialized in a specific process. The memory may be, for example, a semiconductor memory, a magnetic memory, or an optical memory. However, the memory is not limited to these memories. The memory may serve as a main storage device, an auxiliary storage device, or a cache memory, for example. The memory may store various pieces of information relating to the action and control of the first speaker 1 and the second speaker 2. The memory may store a system program, an application program, and built-in software.

The processor of each of the first speaker 1 and the second speaker 2 can adjust the position or shape of the audio spot by adjusting the direction, intensity and the like of ultrasound emitted according to instruction information received from an external device. As described above, each of the first speaker 1 and the second speaker 2 can be operated by the external device. Alternatively, each of the first speaker 1 and the second speaker 2 may be manually operated.

The first speaker 1 emits ultrasound to a region R1. The second speaker 2 emits ultrasound to a region R2. The audio spot forming system S causes the region R1 and the region R2 to intersect with each other on the road W in this manner to form an audio spot S11. A voice is reproduced only at the audio spot S11 and hence, the audio spot forming system S can transmit an alert sound only to the driver of a vehicle that passes through the audio spot S11.

Whether a carrier wave is emitted from the first speaker 1 or the second speaker 2 is not limited. However, a sound pressure at the audio spot S11 depends on a carrier wave. Therefore, to reduce the attenuation of a carrier wave, it is desirable to arrange a speaker which emits the carrier wave at a position close to the audio spot S11. In the case of FIG. 1 except for a case where a road has a large width, the second speaker 2 is closer to the audio spot S11 than the first speaker 1. Therefore, the second speaker 2 emits a carrier wave, and the first speaker 1 emits a sideband wave.

Figure 2:
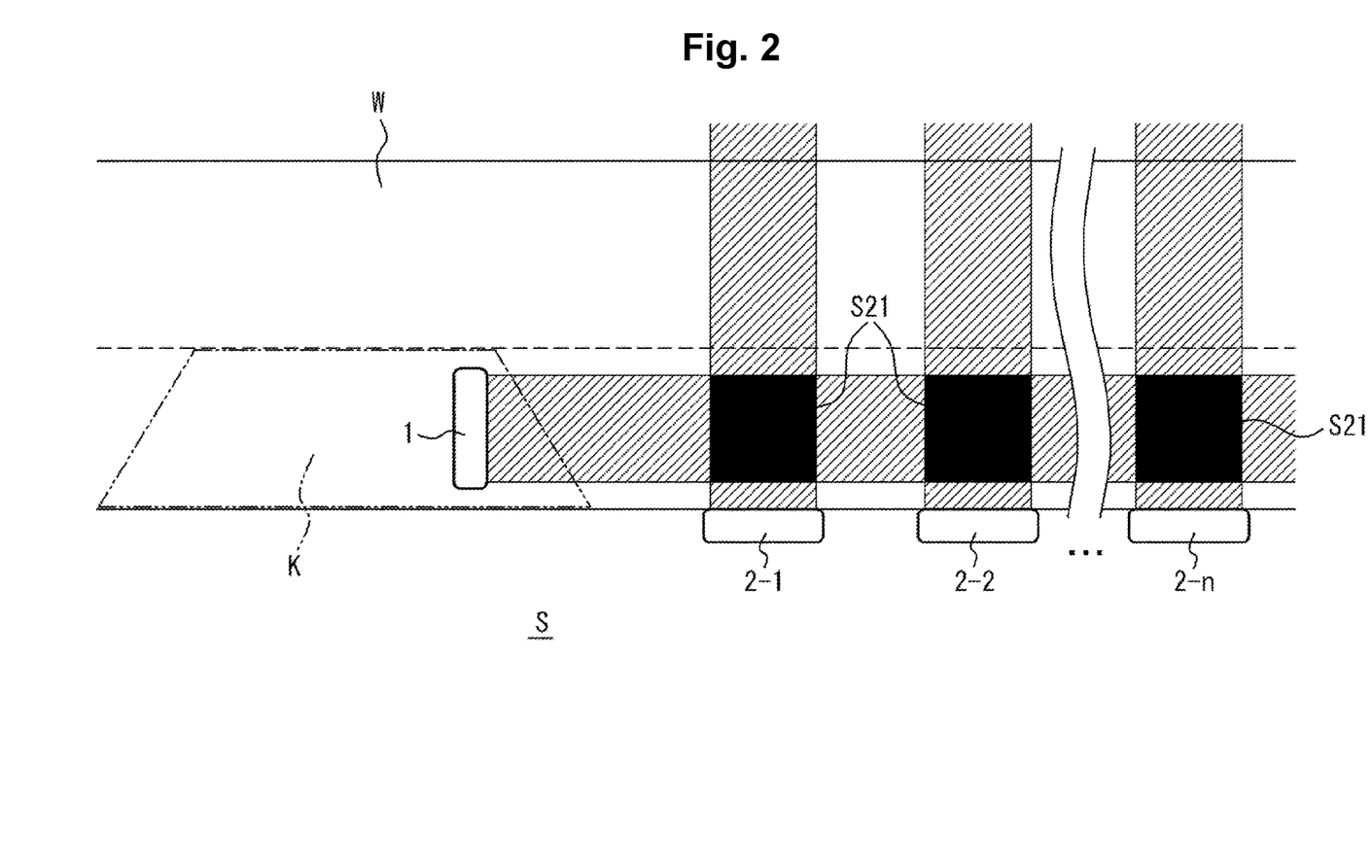
FIG. 2 is an arrangement diagram of a plurality of second speakers.

The description will be made with reference to FIG. 2 with respect to a case where the second speakers 2 which emit carrier wave is plural. The first speaker 1 emits a sideband wave. Each second speaker 2 emits a carrier wave. As the second speakers 2, a plurality of second speakers 2-1, 2-2, . . . (omission) . . . and 2-*n* are arranged along a direction in which a vehicle travels. Symbol "n" is a natural number of two or more.

The audio spot forming system S forms n number of audio spots S21. The audio spot forming system S can alert the driver a plurality of number of times in the n number of formed audio spots S21. A larger value for "n" allows the audio spot forming system S to reduce the possibility of collision. The value of "n" may be determined by taking into account the width or shape of a road, geographic constraint at the time of installing the speakers, cost for installing the speakers, an operation state and the like.

The description will be made with reference to FIG. 3 with respect to a case where the first speakers 1 which emit sideband wave is plural.

In the case of forming an audio spot by separate emission of a carrier wave and a sideband as described in the above-mentioned Non-Patent Literature 3, it is known that when the sideband wave is more finely divided for each frequency band, sound quality of a sound reproduced at the audio spot is more improved and a volume of the sound can be more increased.

Figure 3:
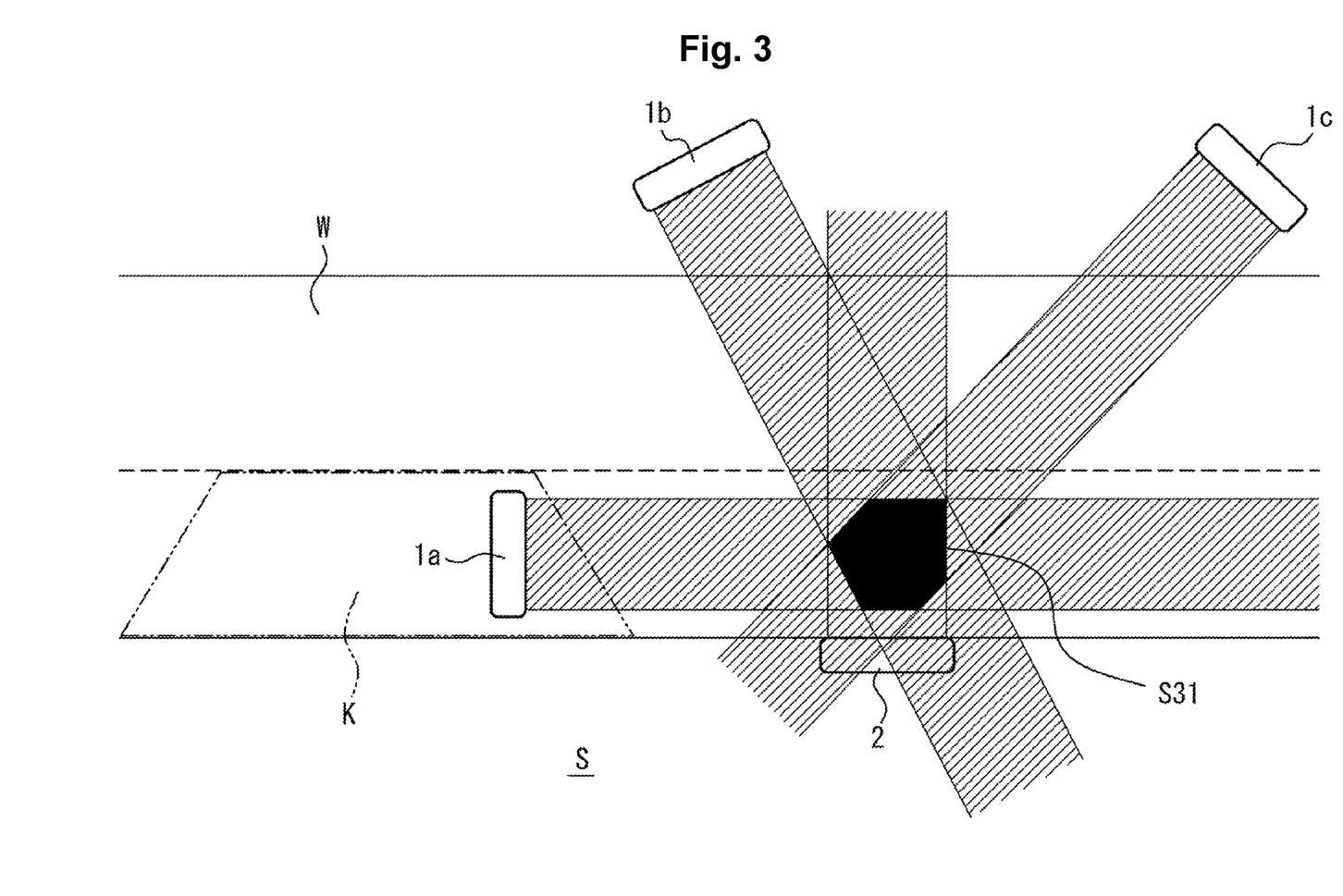
FIG. 3 is an arrangement diagram of a plurality of first speakers.

In view of the above, as shown in FIG. 3, three first speakers 1a, 1b and 1c are arranged as the first speakers 1 which emit sideband wave. The audio spot forming system S emits a plurality of band-division sideband waves from the plurality of first speakers 1a, 1b and 1c and causes the plurality of emitted sideband waves to intersect with a carrier wave in a single region on a road to form a single audio spot S31. The number of speakers included is not limited to the above. In the case where the first speakers 1 which emit sideband wave is plural, it is possible to obtain improved sound quality in the formed audio spot S31 compared with the case where the first speaker 1 which emit sideband wave is single. That is, in alerting the driver by a voice, it is possible to transmit the voice more clearly.

Figure 4:
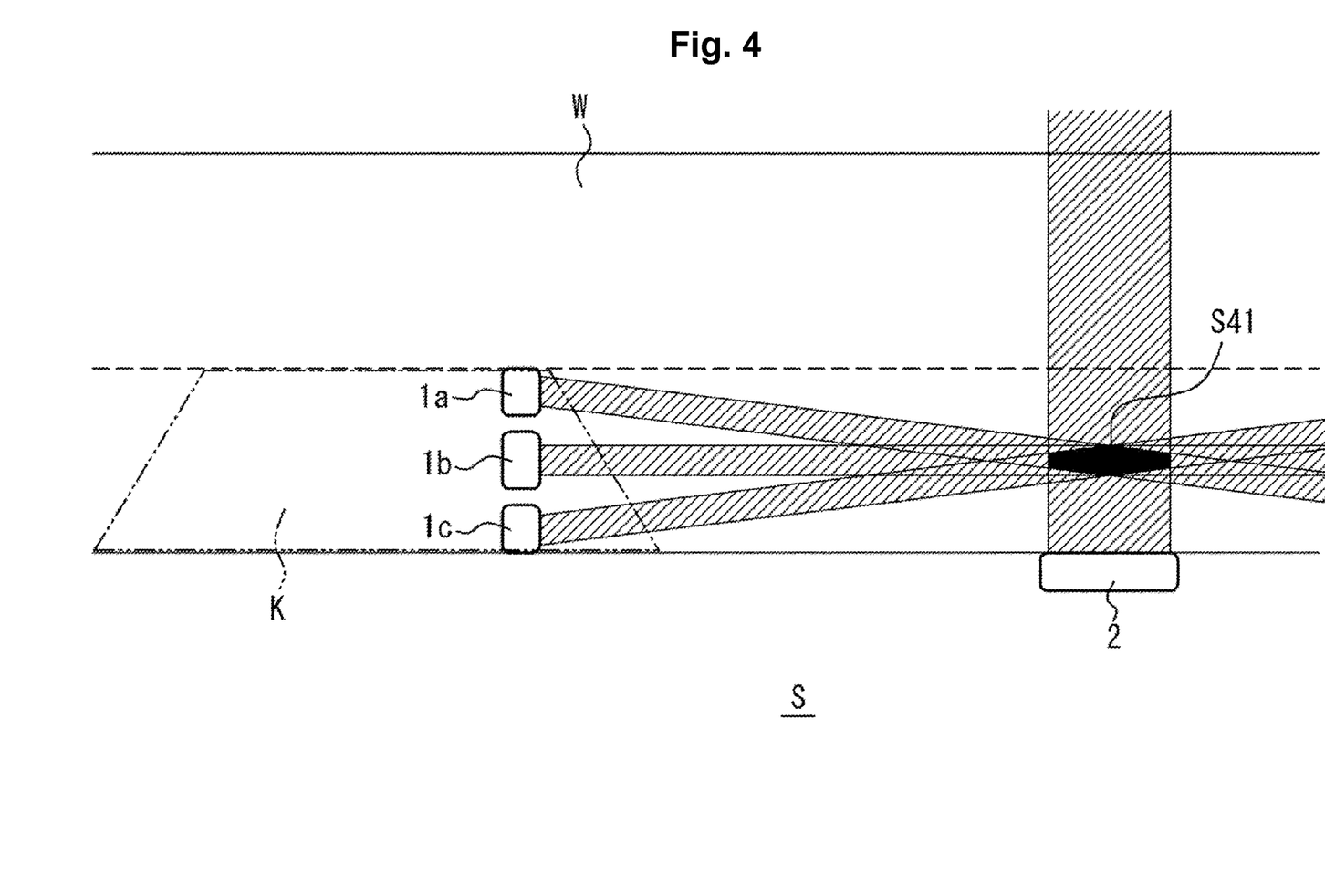
FIG. 4 is an arrangement diagram showing a case where the plurality of first speakers are arranged in a construction work zone.

The description will be made with reference to FIG. 4 with respect to a case where the plurality of first speakers 1 are arranged in the construction work zone K. In a case where it is desirable to reduce the number of speakers arranged in a roadside belt due to geographic constraint, as shown in FIG. 4, a plurality of speakers, that is, three first speakers 1a, 1b, and 1c may be arranged in the construction work zone K. The number of first speakers 1 arranged is not limited to the above. Each first speaker 1 emits a sideband wave. The second speaker 2 emits a carrier wave. As shown in FIG. 4, the second speaker 2 is arranged at a position closer to an audio spot S41 than the first speaker 1. Such an arrangement can achieve a state where a sound pressure is maintained, thus allowing preferable sound quality.

Figure 5:
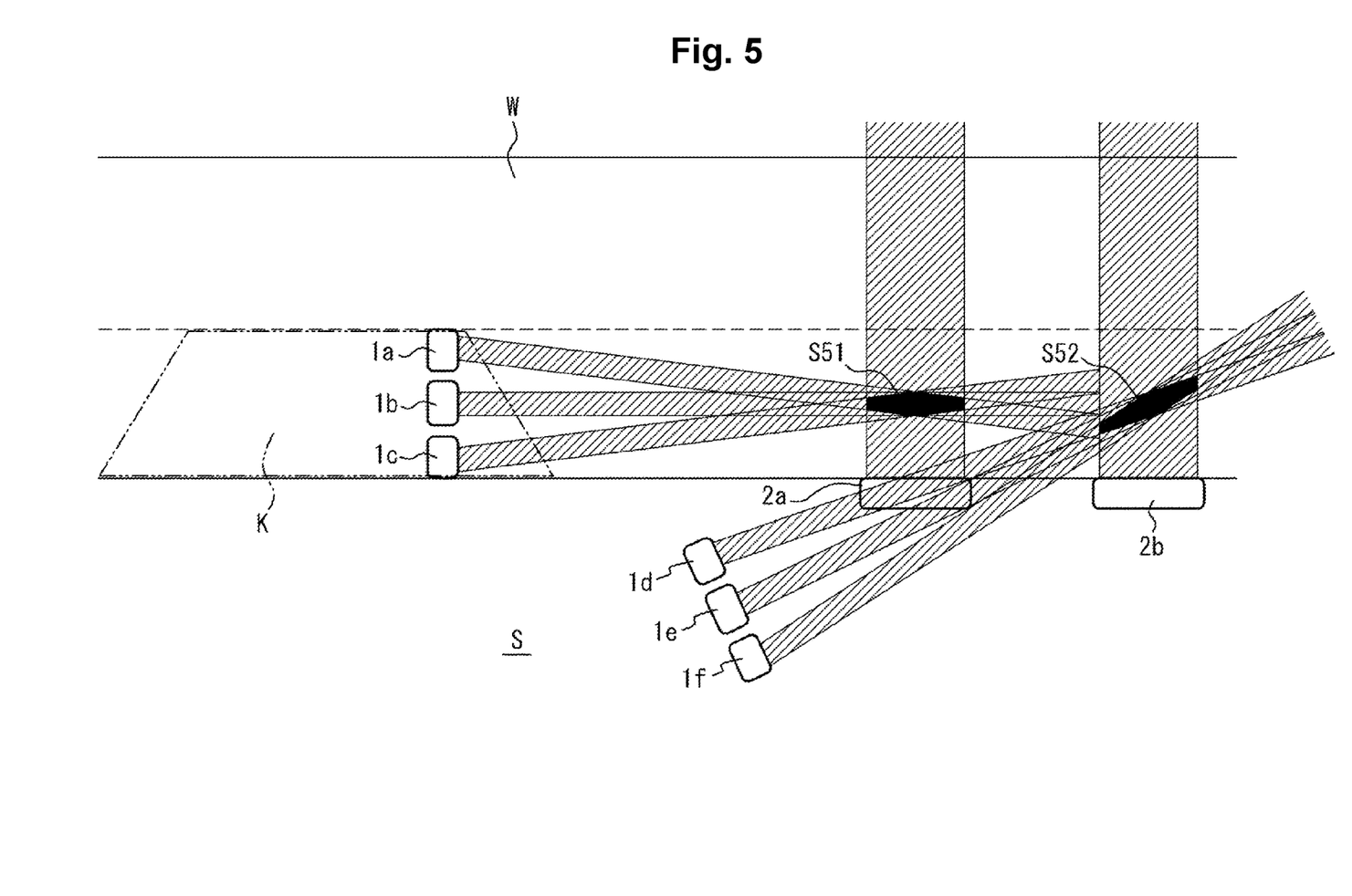
FIG. 5 is an arrangement diagram of a plurality of first speakers and a plurality of second speakers.

Alternatively, as shown in FIG. 5, a plurality of speakers, that is, six first speakers 1a, 1b, 1c, 1d, 1e and 1f may be arranged as the first speakers 1. Two second speakers 2a and 2b may be arranged as the second speakers 2. An audio spot S51 is formed in a region where sideband waves emitted from the first speakers 1a, 1b and 1c and a carrier wave emitted from the second speaker 2a overlap with each other. Another audio spot S52 is further formed in a region where sideband waves emitted from the first speakers 1d, 1e and 1f and a carrier wave emitted from the second speaker 2b overlap with each other. By arranging the plurality of first speakers 1 and the plurality of second speakers 2 in a roadside belt and the construction work zone K in this manner, it is possible to form the plurality of audio spots S51 and S52.

[Method for Determining Size of Audio Spot]

The size of the audio spot is determined at least by the size of one speaker and an angle made by ultrasounds emitted by the speakers. It is desirable that the audio spot is as large as possible within a range where the audio spot can be placed on a road. However, there may be a case where it is difficult to form a large region due to cost or operation. A method for determining a minimum size of the region will be described below.

The audio spot forming system S of this embodiment makes an alert by transmitting an alert sound to the driver of a traveling vehicle. Assume that the travel speed of the vehicle is P [m/sec]. Assuming a scene of a vehicle causing an entry accident, it is preferable to estimate "P" to be a large value.

Consideration is given to how many seconds a driver is caused to hear an alert sound. In a case where the alert sound is set to a monotonous warning sound, a length is set which allows a target driver to perceive the monotonous warning sound as the alert sound. As information contributing to determine such a length, in the following Non-Patent Literature 4, the length of a strong caution sound is specified as 1.8 seconds or more.

[Non-Patent Literature 4] "Guideline relating to notification sound to improve operability of home appliance", pp 9, [online], 2018, March, Association for Electric Home Appliances universal design committee, [searched on Mar. 18, 2020], Internet, <URL: https://www.aeha.or.jp/ud/pdf/ud_guideline_5.pdf>

By taking into account the above-mentioned Non-Patent Literature 4, for example, the length of the alert sound in this embodiment may be set to one or more seconds.

Figure 6A:
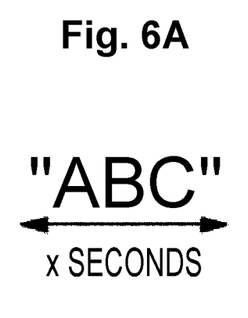
FIG. 6A is a view showing a case where "ABC" is taken as an example of a character string which is required to be transmitted to a driver of a vehicle.
Figure 6B:
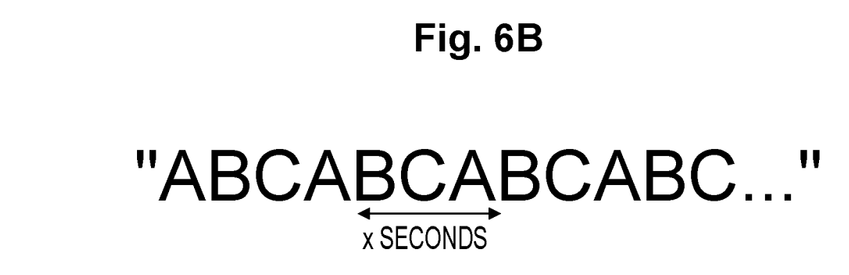
FIG. 6B is a view showing a character string obtained by repeating the character string shown in FIG. 6A.

In contrast, in a case where the alert sound is not set to the monotonous warning sound, but is set to a voice obtained by reproducing a character string, a length is set which is required for the content and meaning of the voice to be transmitted to the driver. For the sake of the description, the minimum character string which is desired to be transmitted to the driver is taken as "ABC". The audio spot forming system S reproduces a voice of "ABCABCABC . . . " obtained by repeating "ABC". Assuming that x [sec] is required to reproduce "ABC" one time as shown in FIG. 6A, x [sec] is required to reproduce "BCA" one time in the same manner. In a case where a sound heard by the driver at the beginning is "B" as shown in FIG. 6B, when only such a voice is reproduced only for x [sec], a sound of "BCA" is transmitted to the driver. Therefore, the meaning cannot be properly conveyed.

Figure 6C:
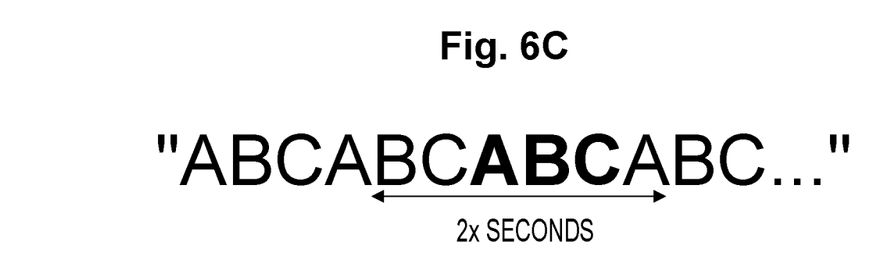
FIG. 6C is a view showing a character string which is reproduced when a voice is reproduced for 2x seconds.

In view of the above, to cause the driver to hear "ABC" at least one time even when the first sound heard by the driver at the beginning is any one of "A", "B" or "C", as shown in FIG. 6C, it is sufficient to reproduce the voice for at least 2x [sec]. The character string of "ABC" is shown in bold font. In the audio spot forming system S, the length of the voice is set to 2x [sec]. Settings may be applied by the external device or may be made manually as described above.

Figure 7A:
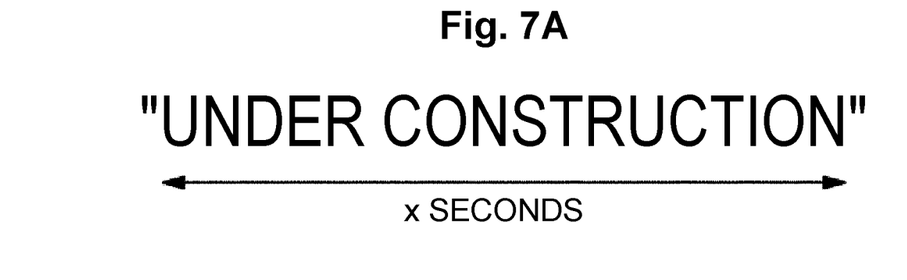
FIG. 7A is a view showing a character string which is required to be transmitted to a driver of a vehicle.
Figure 7B:
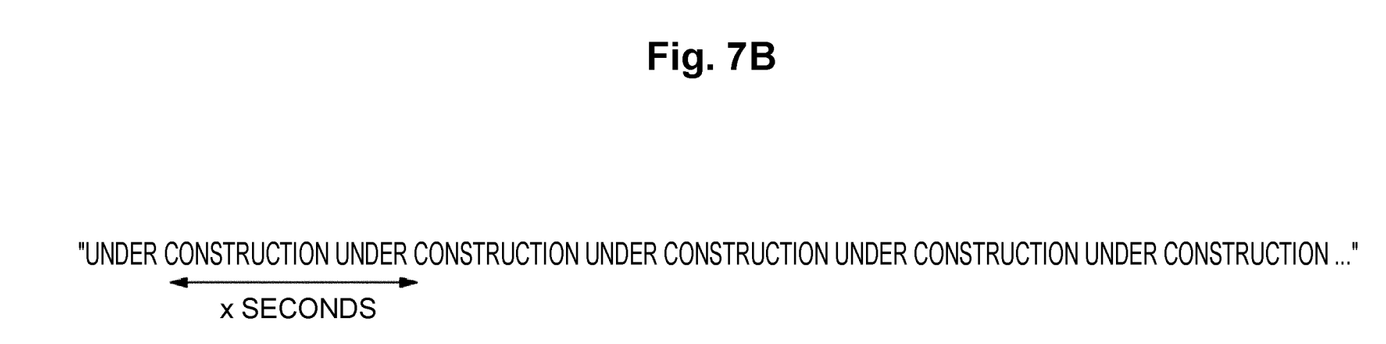
FIG. 7B is a view showing a character string obtained by repeating the character string shown in FIG. 7A.
Figure 7C:
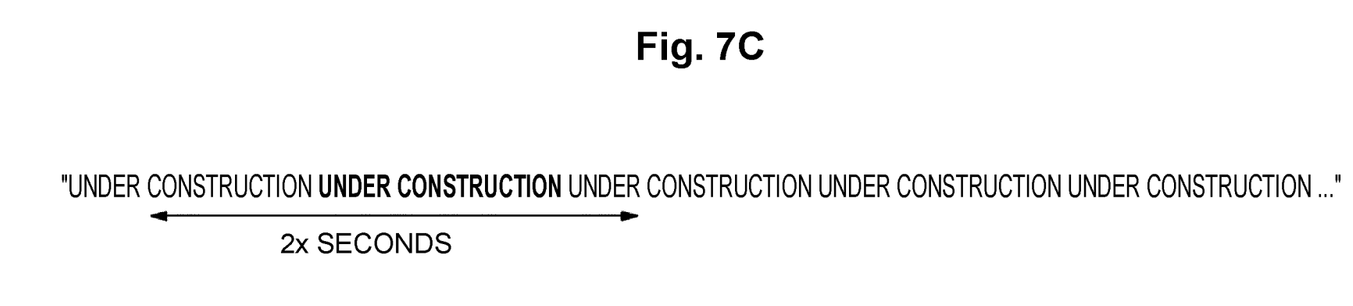
FIG. 7C is a view showing a character string which is reproduced when a voice is reproduced for 2x seconds.

The description will be made with respect to a case where a voice of "under construction" as described in FIG. 7A is transmitted in place of the voice of "ABC" described in FIG. 6A. Assume that x [sec] is required to reproduce "under construction" one time. In a case where such a voice is reproduced only for x [sec], depending on the timing of the beginning to hear the voice, only a meaningless voice of "construction under" is transmitted as shown in FIG. 7B. To definitely reproduce "under construction" one time even when the driver begins hearing the voice from any character of "under construction", it is sufficient to reproduce a sound for 2x [sec] as shown in FIG. 7C. A character string of "under construction" is shown in bold font. In the audio spot forming system S, the length of the voice is set to 2x [sec].

According to the above-mentioned examples described with reference to FIG. 6A to FIG. 6C and FIG. 7A to FIG. 7C, the length of the sound reproduced by the audio spot forming system S is set to 2x [sec]. By taking into account that the vehicle speed is P [m/sec], the length of the audio spot in each direction in which a vehicle travels is set to 2xP [m] or more.

Figure 8:
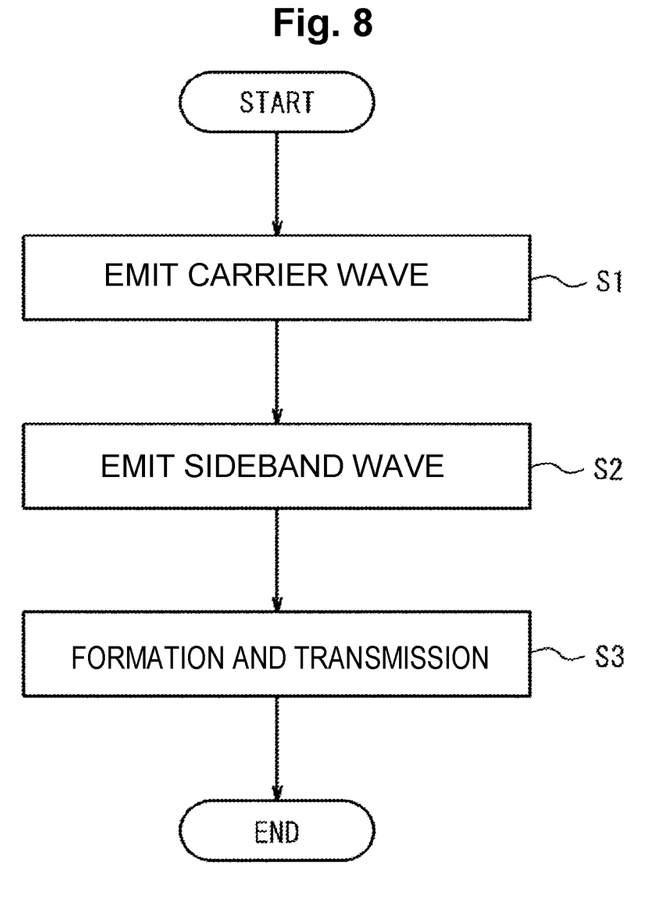
FIG. 8 is a flowchart of a process performed by the audio spot forming system.

The description will be made with reference to FIG. 8 with respect to a method for forming the audio spot which is performed by the audio spot forming system S.

In step S1, the second speaker 2 emits a carrier wave.

In step S2, the first speaker 1 emits a sideband wave. Alternatively, the order of step S1 and step S2 may be reversed. Alternatively, the first speaker 1 may emit a carrier wave, and the second speaker 2 may emit a sideband wave.

In step S3, the audio spot forming system S forms an audio spot in a region where the carrier wave and the sideband wave intersect with each other, and transmits a sound to the driver of a vehicle that passes through the audio spot.

As described above, according to this embodiment, the audio spot forming system S is configured to cause the sideband wave and the carrier wave to intersect with each other on a road to form the audio spot, and configured to transmit an alert sound to a vehicle traveling on the road. With such a configuration, the audio spot forming system S can make an alert by a sound only in a specific region through which the driver of a vehicle passes and hence, it is possible to reduce entry accidents.

According to this embodiment, the second speaker 2 includes the plurality of second speakers 2-1, 2-2 and 2-n, and the plurality of second speakers 2-1, 2-2 and 2-n are arranged along the direction in which the vehicle travels. The audio spot forming system S is configured to cause each of a plurality of carrier waves emitted from the plurality of second speakers 2-1, 2-2 and 2-n to intersect with a sideband wave on a road, and to form a plurality of audio spots. With such a configuration, the audio spot forming system S can alert the driver a plurality of number of times and hence, it is possible to reduce a possibility of collision.

According to this embodiment, the first speaker 1 includes the plurality of first speakers 1a, 1b and 1c. The audio spot forming system S is configured to emit a plurality of band-division sideband waves from the plurality of first speakers 1a, 1b and 1c, and configured to cause the plurality of sideband waves to intersect with a carrier wave in a single region on a road to form a single audio spot. With such a configuration, the audio spot forming system S can improve sound quality of a sound reproduced at the audio spot and hence, it is possible to increase a volume of the sound.

According to this embodiment, the second speaker 2 is arranged at a position closer to the audio spot than the first speaker 1. With such a configuration, the audio spot forming system S can reduce the attenuation of a carrier wave.

According to this embodiment, the audio spot forming system S is configured such that a voice obtained by repeatedly reproducing the minimum character string required to be transmitted to the driver of a vehicle is transmitted as an alert sound and, the length of the audio spot in a direction in which the vehicle travels is set to 2xP [m], where a time period required to reproduce the required minimum character string is x [sec] and the travel speed of the vehicle is P [m/sec]. With such a configuration, the audio spot forming system S can transmit, at least one time, a voice which is required to be transmitted to the driver and hence, it is possible to reduce entry accidents.

A control unit (not shown in the drawing) of the first speaker 1 in this embodiment can also be achieved by any computer and a program. Specifically, a program describing processing content for achieving respective functions of the first speaker 1 is recorded in a recording medium, such as a memory, and the program is read and executed by a processor. In the same manner, a control unit (not shown in the drawing) of the second speaker 2 in this embodiment may also be achieved by an any computer and a program. Specifically, a program describing processing content for achieving respective functions of the second speaker 2 is recorded in a recording medium, such as a memory, and the program is read and executed by a processor. Such a program may also be provided through a network.

This program may be recorded in a computer-readable medium. When the computer-readable medium is used, the program can be installed in a computer. Note that the computer-readable medium in which the program is recorded may be a non-transitory recording medium. The non-transitory recording medium is not particularly limited. For example, the non-transitory recording medium may be a recording medium, such as a CD-ROM or a DVD-ROM.

The present invention has been described based on the drawings and the embodiment. However, note that various variations and modifications may be easily made by those who are skilled in the art based on the present disclosure. Accordingly, it is noted that these variations and modifications are included in the scope of the present invention. For example, components or functions included in the respective steps may be rearranged in a logically consistent manner. Further, the plurality of components or steps may be combined into one component or one step, or may be divided.

REFERENCE SIGNS LIST

S audio spot forming system
1 (1a, 1b, 1c, 1d, 1e, 1f) first speaker
2 (2-1, 2-2, 2-n, 2a, 2b) second speaker

The invention claimed is:

1. An audio spot forming system for transmitting an alert sound to a vehicle traveling on a road, the audio spot forming system comprising:
   a first parametric speaker configured to emit a sideband wave; and
   a second parametric speaker configured to emit a carrier wave, wherein the sideband wave and the carrier wave intersect with each other on the road to form an audio spot, wherein
   the second parametric speaker includes a plurality of second speakers,
   the plurality of second speakers is arranged along a direction in which the vehicle travels on the road, and
   a plurality of carrier waves emitted from the plurality of second speakers are each caused to intersect with the sideband wave on the road to form a plurality of audio spots.

2. The audio spot forming system according to claim 1, wherein
   the first parametric speaker includes a plurality of first speakers, and
   a plurality of band-division sideband waves emitted from the plurality of first speakers are caused to intersect with the carrier wave in a single region on the road to form a single audio spot.

3. The audio spot forming system according to claim 2, wherein
   the second parametric speaker is arranged at a position closer to the audio spot than the first parametric speaker.

4. The audio spot forming system according to claim 2, wherein
   a voice obtained by repeatedly reproducing a minimum character string required to be transmitted to a driver of the vehicle is transmitted as the alert sound, and
   a length of the audio spot in a direction in which the vehicle travels is set to 2xP [m], where a time period required to reproduce the minimum character string is x [sec] and a travel speed of the vehicle is P [m/sec].

5. The audio spot forming system according to claim 1, wherein
   the second parametric speaker is arranged at a position closer to the audio spot than the first parametric speaker.

6. The audio spot forming system according to claim 5, wherein a voice obtained by repeatedly reproducing a minimum character string required to be transmitted to a driver of the vehicle is transmitted as the alert sound, and a length of the audio spot in a direction in which the vehicle travels is set to 2xP [m], where a time period required to reproduce the minimum character string is x [sec] and a travel speed of the vehicle is P [m/sec].

7. The audio spot forming system according to claim 1, wherein a voice obtained by repeatedly reproducing a minimum character string required to be transmitted to a driver of the vehicle is transmitted as the alert sound, and a length of the audio spot in a direction in which the vehicle travels is set to 2xP [m], where a time period required to reproduce the minimum character string is x [sec] and a travel speed of the vehicle is P [m/sec].

8. The audio spot forming system according to claim 1, wherein the second parametric speaker is arranged at a position closer to the audio spot than the first parametric speaker.

9. The audio spot forming system according to claim 1, wherein a voice obtained by repeatedly reproducing a minimum character string required to be transmitted to a driver of the vehicle is transmitted as the alert sound, and a length of the audio spot in a direction in which the vehicle travels is set to 2xP [m], where a time period required to reproduce the minimum character string is x [sec] and a travel speed of the vehicle is P [m/sec].

10. A method for forming an audio spot where an alert sound is transmitted to a vehicle traveling on a road, the method comprising:

emitting a sideband wave by a first parametric speaker;

emitting a carrier wave by a second parametric speaker; and forming the audio spot by causing the sideband wave and the carrier wave to intersect with each other on the road, wherein the second parametric speaker includes a plurality of second speakers, the plurality of second speakers is arranged along a direction in which the vehicle travels on the road, and a plurality of carrier waves emitted from the plurality of second speakers are each caused to intersect with the sideband wave on the road to form a plurality of audio spots.

11. The method according to claim 10, wherein
the first parametric speaker includes a plurality of first speakers, and
a plurality of band-division sideband waves emitted from the plurality of first speakers are caused to intersect with the carrier wave in a single region on the road to form a single audio spot.

12. The method according to claim 11, wherein
the second parametric speaker is arranged at a position closer to the audio spot than the first parametric speaker.

13. The method according to claim 11, wherein
a voice obtained by repeatedly reproducing a minimum character string required to be transmitted to a driver of the vehicle is transmitted as the alert sound, and
a length of the audio spot in a direction in which the vehicle travels is set to 2xP [m], where a time period required to reproduce the minimum character string is x [sec] and a travel speed of the vehicle is P [m/sec].

14. The method according to claim 10, wherein
the second parametric speaker is arranged at a position closer to the audio spot than the first parametric speaker.

15. The method according to claim 14, wherein
a voice obtained by repeatedly reproducing a minimum character string required to be transmitted to a driver of the vehicle is transmitted as the alert sound, and
a length of the audio spot in a direction in which the vehicle travels is set to 2xP [m], where a time period required to reproduce the minimum character string is x [sec] and a travel speed of the vehicle is P [m/sec].

16. The method according to claim 10, wherein
a voice obtained by repeatedly reproducing a minimum character string required to be transmitted to a driver of the vehicle is transmitted as the alert sound, and
a length of the audio spot in a direction in which the vehicle travels is set to 2xP [m], where a time period required to reproduce the minimum character string is x [sec] and a travel speed of the vehicle is P [m/sec].

17. The method according to claim 10, wherein
the second parametric speaker is arranged at a position closer to the audio spot than the first parametric speaker.

18. The method according to claim 10, wherein
a voice obtained by repeatedly reproducing a minimum character string required to be transmitted to a driver of the vehicle is transmitted as the alert sound, and
a length of the audio spot in a direction in which the vehicle travels is set to 2xP [m], where a time period required to reproduce the minimum character string is x [sec] and a travel speed of the vehicle is P [m/sec].

* * * * *